US012717289B2

(12) United States Patent
Shimokawa

(10) Patent No.: US 12,717,289 B2
(45) Date of Patent: Aug. 25, 2026

(54) REMOTE-CONTROL APPARATUS, LOCAL-CONTROL APPARATUS, LEARNING PROCESSING APPARATUS, METHOD, AND RECORDING MEDIUM THAT COMPENSATES FOR DELAY OF TRANSMITTED MEASUREMENT VALUES

(71) Applicant: Yokogawa Electric Corporation, Tokyo (JP)

(72) Inventor: Tatsuya Shimokawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 457 days.

(21) Appl. No.: 18/314,108

(22) Filed: May 8, 2023

(65) Prior Publication Data

US 2023/0384744 A1 Nov. 30, 2023

(30) Foreign Application Priority Data

May 27, 2022 (JP) ................................ 2022-087122

(51) Int. Cl.
*G05B 13/04* (2006.01)
*G05B 13/02* (2006.01)

(52) U.S. Cl.
CPC ....... *G05B 13/047* (2013.01); *G05B 13/0265* (2013.01)

(58) Field of Classification Search
CPC .......................... G05B 13/047; G05B 13/0265
USPC ........................................................... 700/31
See application file for complete search history.

(56) References Cited

U.S. PATENT DOCUMENTS 6,243,610 B1 6/2001 Iino
9,946,231 B2 * 4/2018 Sargolzaei ........... G05B 13/021
2015/0304193 A1 10/2015 Ishii
2019/0332918 A1 10/2019 David
2020/0057416 A1 * 2/2020 Matsubara ............ G06N 20/10
(Continued)

FOREIGN PATENT DOCUMENTS

CN 111045331 A 4/2020
JP 2020027556 A 2/2020
JP 6813416 B2 1/2021

OTHER PUBLICATIONS

Extended European Search Report for counterpart European Application No. 23173731.3, issued by the European Patent Office on Oct. 24, 2023.

(Continued)

*Primary Examiner* — Jigneshkumar C Patel

(57) ABSTRACT

[Solving means] A remote-control apparatus, including a measurement value receiving unit for receiving a measurement value related to equipment from a local-control apparatus configured to control the equipment; a calculating unit for calculating a control value corresponding to the measurement value received by the measurement value receiving unit and a delay amount, by using a model configured to calculate a control value that should be used for control of the equipment when there is caused control delay including communication delay with the local-control apparatus from a delay amount corresponding to the control delay and a measurement value; and a control value transmitting unit for transmitting the control value calculated by the calculating unit to the local-control apparatus, is provided.

12 Claims, 9 Drawing Sheets

(56) References Cited

U.S. PATENT DOCUMENTS

2020/0310364 A1* 10/2020 Asai .................. G05B 19/4185
2021/0171383 A1* 6/2021 Hatta ........................ C02F 9/00

OTHER PUBLICATIONS

Office Action issued for counterpart Chinese Application 202310612021.8, issued by The State Intellectual Property Office of People's Republic of China on Jun. 27, 2026.

* cited by examiner

| DELAY AMOUNT Δt | MEASUREMENT VALUE 1 | MEASUREMENT VALUE 2 | CONTROL OPERATION |
|---|---|---|---|
| 200 | 0.8 | 0.2 | 5 |
| 200 | 0.8 | 0.2 | 3 |
| 200 | 0.8 | 0.2 | 1 |
| 200 | 0.8 | 0.2 | 0 |
| 200 | 0.8 | 0.2 | −3 |
| 200 | 0.8 | 0.2 | −5 |

*FIG.4*

| DELAY AMOUNT Δt | MEASUREMENT VALUE 1 | MEASUREMENT VALUE 2 | CONTROL OPERATION | WEIGHT |
|---|---|---|---|---|
| 297.1191 | 24.2511 | 70 | 5 | 144.1484 |
| 310.4248 | 27.4251 | 71 | 1 | −218.316 |
| 318.8477 | 27.89047 | 70 | 0 | 117.1561 |
| 627.1484 | 26.479 | 70 | 1 | −252.506 |
| 0 | 32.89337 | 74 | −3 | 82.16214 |
| 339.7827 | 30.67796 | 68 | −3 | 154.4256 |
| 820.6177 | 26.53965 | 64 | 5 | 156.0428 |
| 303.3447 | 29.70328 | 66 | −3 | 75.27125 |
| 599.3164 | 27.62347 | 64 | 1 | −491.443 |
| 278.3203 | 19.13351 | 53 | −3 | −203.099 |
| 256.7139 | 21.08102 | 51 | 3 | 198.1082 |
| 25.36011 | 21.30703 | 57 | 0 | 278.2919 |
| 260.9863 | 22.49868 | 57 | 1 | 76.35704 |
| 28.6438 | 22.48553 | 64 | −3 | 262.9233 |

*FIG.5*

| INDEX | DELAY AMOUNT Δt | CONTROL OPERATION |
| --- | --- | --- |
| 1 | 0[ms] | OPEN VALVE BY 5% |
| 2 | 200[ms] | OPEN VALVE BY 3% |
| ⋮ | ⋮ | ⋮ |
| 5 | 800[ms] | CLOSE VALVE BY 3% |
| 6 | 1000[ms] | CLOSE VALVE BY 5% |

*FIG.6*

REMOTE-CONTROL APPARATUS, LOCAL-CONTROL APPARATUS, LEARNING PROCESSING APPARATUS, METHOD, AND RECORDING MEDIUM THAT COMPENSATES FOR DELAY OF TRANSMITTED MEASUREMENT VALUES

The contents of the following Japanese patent application(s) are incorporated herein by reference:

NO. 2022-087122 filed in JP on May 27, 2022.

BACKGROUND

1. Technical Field

The present invention relates to a remote-control apparatus, a local-control apparatus, a learning processing apparatus, a method, and a recording medium.

2. Related Art

Patent Document 1 describes that "The distributed control system (DCS: Distributed Control System) to which a sensor, operation equipment, and the control device that controls these were connected via the means of communication in equipment of a plant etc. is built. The advanced automatic operation by DCS is realized."

PRIOR ART DOCUMENT

Patent Document

Patent Document 1: Japanese Patent Application Publication No. 2020-027556

Summary

BRIEF DESCRIPTION OF THE DRAWINGS

FIG. 4 illustrates one example of a control operation deciding table.

FIG. 5 illustrates one example of a weight table of a model 135.

FIG. 6 illustrates one example of a table showing correspondence of a plurality of control values to multiple delay amounts.

DESCRIPTION OF EXEMPLARY EMBODIMENTS

Hereinafter, embodiments of the present invention will be described. However, the following embodiments do not limit the invention according to the claims. In addition, some combinations of features described in the embodiments may not be essential to the solving means of the invention.

Figure 1:
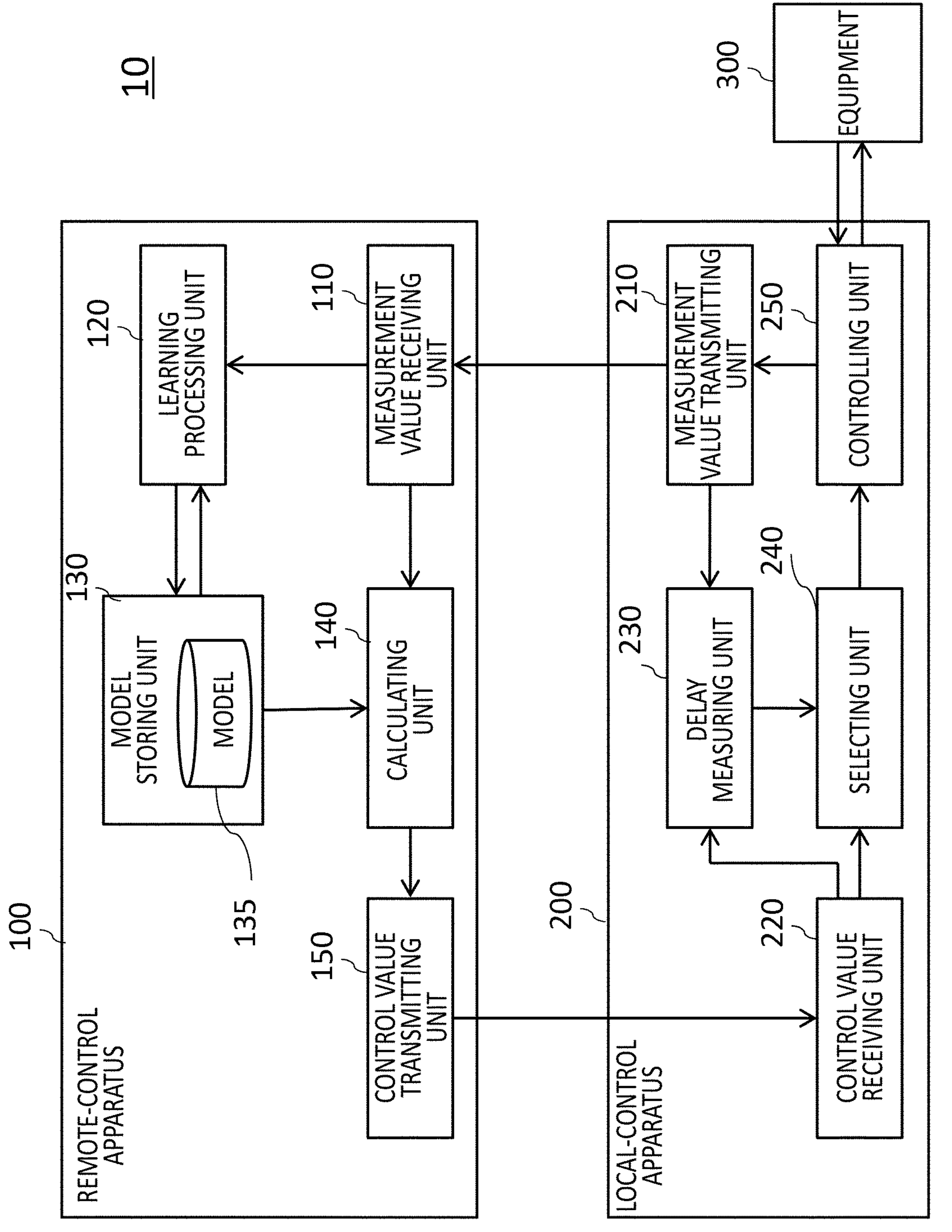
FIG. 1 illustrates one example of a block diagram of a control system 10 according to the present embodiment.

FIG. 1 illustrates one example of a block diagram of a control system 10 in which a remote-control apparatus 100 and a local-control apparatus 200 according to the present embodiment may be included. Note that, these blocks are functional blocks that are functionally separated from each other, and may not necessarily be identical to actual structure of the apparatuses. That is, even if a unit is shown with one block in the drawings, the unit may not necessarily be formed of one apparatus. Also, even if units are shown with separate blocks in the drawings, the units may not necessarily be formed of separate apparatuses. The same also applies to the following block diagrams.

By way of example, the control system 10 is for performing maintenance management of a plant, and includes the remote-control apparatus 100, the local-control apparatus 200, and equipment 300. When the control system 10 controls opening/closing of a valve etc. of the equipment 300 by using Proportional Integral Differential (PID) or the like, one cycle is counted from when the local-control apparatus 200 transmits a measurement value of the equipment 300 till when a new measurement value related to the equipment 300 that has been controlled depending on a control value calculated by the remote-control apparatus 100 is obtained, and the opening/closing operation is performed for multiple cycles. The control system 10 executes control of equipment by taking into account control delay caused by data transmission/reception between the remote-control apparatus 100 and the local-control apparatus 200 in such control.

In the control system 10, the local-control apparatus 200 is placed in the equipment 300 or near a control target of the equipment 300, and may be a control apparatus deposited at a site where a process is executed in a plant, for example. The remote-control apparatus 100 may be deposited away from the local-control apparatus 200, and be a control instruction apparatus or a control data calculation apparatus deposited in a management center of the plant, for example.

The equipment 300 is a facility or an apparatus in which a device being the control target is provided. For example, the equipment 300 may be a plant, or may also be an apparatus or the like provided in the plant. The plant includes, besides an industrial plant such as a chemical plant, or a biofuel plant, a plant for managing/controlling a wellhead of a gas field, an oil field, etc., or its surroundings, a plant for managing/controlling power generation such as hydraulic power generation, thermal power generation, and nuclear power generation, a plant for managing/controlling energy harvesting such as solar photovoltaic power generation, wind power generation, and a plant for managing/controlling water and sewerage services, a dam, etc., or the like.

For example, the control target in the equipment 300 may be a valve, heater, motor, fan, and an actuator such as a switch, or in other words, an operation end which controls a physical quantity of at least one of a quantity of an object, temperature, pressure, flow rate, speed, pH, or the like in a process of the equipment 300, and execute a given operation according to an operation amount.

The equipment 300 may be provided with one or more sensors which can measure various states, i.e., physical quantities, inside and outside the equipment 300. By way of example, the sensor may output a measurement value obtained by measuring temperatures, flow rates, or the like at various positions of the equipment 300. A measurement value related to the equipment 300 may include such a measurement value. In addition, the measurement value related to the equipment 300 may include an operation amount indicating an opening/closing degree of the valve of the equipment 300. The measurement value may also include, in addition to the data indicating an operating state resulting from the control performed in this way, consumption amount data indicating a consumption amount of energy or raw material in the equipment 300, disturbance environmental data indicating a physical quantity that may act as disturbance on the control of the equipment 300, or the like.

Here, the control value may indicate control on the equipment 300 performed by the local-control apparatus 200, for example, indicate at least one of control operation or a control amount for the control target of the equipment 300. The control value may further indicate the control target of the equipment 300 with an identifier etc. By way of example, the control value may indicate opening or closing the valve of the equipment 300 by n % (n>0, n % may be an opening degree of the valve), increasing or decreasing a flow rate of a given flow channel of the equipment 300 by n %, or the like.

The remote-control apparatus 100 is connected to the local-control apparatus 200, and performs learning processing of a model 135, or transmission of the control value calculated by using this model 135 to the local-control apparatus 200. The remote-control apparatus 100 may be a computer including a PC, a tablet PC, a smartphone, a workstation, a server computer, or a general-purpose computer, or the like, or may also be a computer system to which a plurality of computers is connected. Such a computer system is also considered as a computer in a broad sense. The remote-control apparatus 100 may be implemented in one or more virtual computer environments which can be executed in a computer. Instead of this, the remote-control apparatus 100 may be a dedicated purpose computer designed for maintenance management of the plant, or dedicated hardware embodied by a dedicated circuit. The remote-control apparatus 100 may be embodied by cloud computing.

The remote-control apparatus 100 includes a measurement value receiving unit 110, a learning processing unit 120, a model storing unit 130, a calculating unit 140, and a control value transmitting unit 150. The measurement value receiving unit 110 is connected to the local-control apparatus 200, and receives a measurement value related to the equipment 300 from the local-control apparatus 200 through network (for example, wireless/wired network, Internet, an intranet, or the like, which also applies to the network described below). The measurement value receiving unit 110 may receive control delay measured by the local-control apparatus 200, together with the measurement value. The measurement value receiving unit 110 supplies the learning processing unit 120 and the calculating unit 140 with the received measurement value and control delay.

The learning processing unit 120 is connected to the model storing unit 130, and performs machine learning by using the measurement value and control delay from the measurement value receiving unit 110, and thereby generates and updates the model 135. The model 135 to be processed by the learning processing is for calculating a control value that should be used for the control of the equipment 300 when there is caused control delay including communication delay with the local-control apparatus 200, from a delay amount and a measurement value corresponding to the control delay. The learning processing unit 120 supplies the model storing unit 130 with the model 135 that has been processed by the learning processing.

The model storing unit 130 is connected to the calculating unit 140, and stores the model 135 that has been processed by the learning processing performed by the learning processing unit 120. The model storing unit 130 supplies the calculating unit 140 with the model 135.

The calculating unit 140 is connected to the control value transmitting unit 150, and calculates a control value corresponding to the measurement value and delay amount received by the measurement value receiving unit 110 by using the model 135 stored in the model storing unit 130. The calculating unit 140 may obtain multiple delay amounts corresponding to the control delay including the communication delay with the local-control apparatus 200, input this multiple delay amounts and the measurement value into the model 135, and calculate a plurality of control values corresponding to each of the multiple delay amounts. The calculating unit 140 supplies the control value transmitting unit 150 with the control value.

The control value transmitting unit 150 is connected to the local-control apparatus 200, and transmits the plurality of calculated control values to the local-control apparatus 200 through the network. The control value transmitting unit 150 may associate each of the plurality of control values with each of the multiple delay amounts used in the calculation, and transmit these control values.

The local-control apparatus 200 is connected to the equipment 300, and performs the control of the equipment 300 according to the control values from the remote-control apparatus 100, and also obtains and transmits a measurement value. Similar to the remote-control apparatus 100, the local-control apparatus 200 can also be a computer, a computer such as a PC, a tablet PC, a smartphone, a workstation, a server computer, or a general-purpose computer, or a computer system to which a plurality of computers is connected. The local-control apparatus 200 may be implemented in one or more virtual computer environments which can be executed in a computer. Instead of this, the local-control apparatus 200 can be a dedicated purpose computer designed for maintenance management of the plant, or dedicated hardware embodied by a dedicated circuit. In addition, the local-control apparatus 200 can also be a control controller or the like that uses a microcontroller etc.

The local-control apparatus 200 includes a measurement value transmitting unit 210, a control value receiving unit 220, a delay measuring unit 230, a selecting unit 240, and a controlling unit 250.

The measurement value transmitting unit 210 is connected to the remote-control apparatus 100, the controlling unit 250, and the delay measuring unit 230, and obtains the measurement value related to the equipment 300 from the controlling unit 250, and then transmits the measurement value to the remote-control apparatus 100 through the network. The measurement value transmitting unit 210 may transmit control delay measured by the delay measuring unit 230 to the remote-control apparatus 100, together with the measurement value. The measurement value transmitting unit 210 may supply the delay measuring unit 230 with information representing time at which the measurement value was transmitted to the remote-control apparatus 100.

The control value receiving unit 220 is connected to the delay measuring unit 230 and the selecting unit 240, and receives a plurality of control values corresponding to the measurement value transmitted by the measurement value transmitting unit 210 from the remote-control apparatus 100 through the network. The control value receiving unit 220 may receive a plurality of control values calculated from a measurement value transmitted immediately before by the measurement value transmitting unit 210. The control value receiving unit 220 supplies the selecting unit 240 with the plurality of control values. The control value receiving unit 220 may supply the delay measuring unit 230 with information representing time at which the control values were received.

The delay measuring unit 230 is connected to the selecting unit 240, and may measure a period from when the measurement value transmitting unit 210 transmits a measurement value till when the control value receiving unit 220 receives the plurality of control values corresponding to this measurement value, and thereby decide control delay. The delay measuring unit 230 may decide the control delay based on the information obtained from the control value receiving unit 220 and measurement value transmitting unit 210. The delay measuring unit 230 supplies the selecting unit 240 with the decided control delay. The delay measuring unit 230 may supply the measurement value transmitting unit 210 with the decided control delay.

The selecting unit 240 is connected to the controlling unit 250, and selects a control value to be used for the control of the equipment 300 among the plurality of control values, depending on the control delay including the communication delay with the remote-control apparatus 100. The selecting unit 240 may select the control value to be used for the control of the equipment 300 among the plurality of control values, depending on the control delay decided by the delay measuring unit 230. The selecting unit 240 supplies the controlling unit 250 with control data indicating the selected control value.

The controlling unit 250 is connected to the equipment 300, and performs the control of the equipment 300 according to the selected control value. The controlling unit 250 may perform the control of the equipment 300 such as opening/closing the valve, and also obtain a new measurement value about the equipment 300 after this control. The controlling unit 250 may obtain multiple types of measurement values measured by a plurality of different sensors related to the equipment 300. The controlling unit 250 supplies the measurement value transmitting unit 210 with the obtained measurement values.

Figure 2:
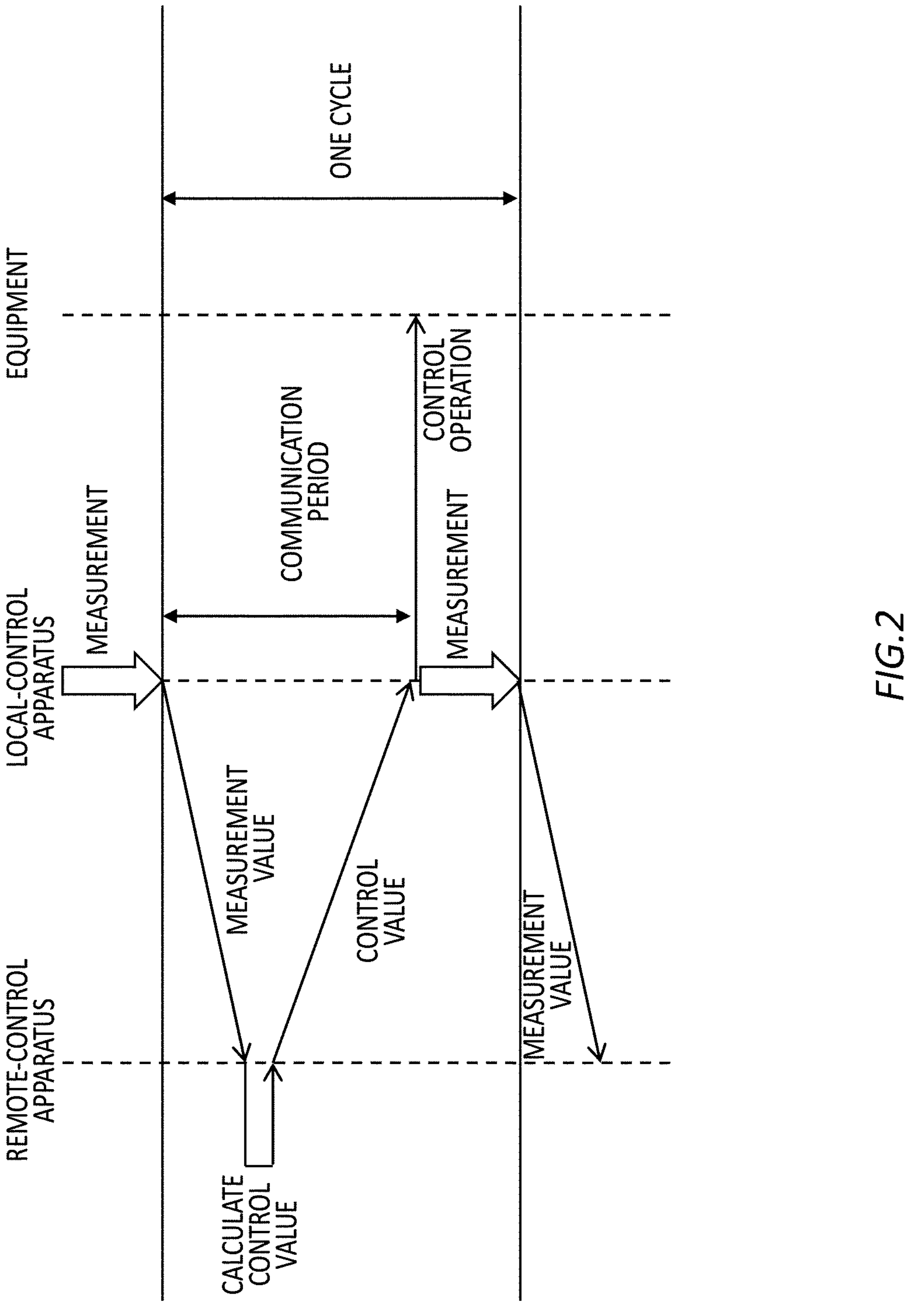
FIG. 2 is a drawing for explaining communication in the control system 10.

FIG. 2 is a drawing for explaining communication related to the one cycle in the control system 10. In FIG. 2, each dotted-line for the remote-control apparatus 100, the local-control apparatus 200, and the equipment 300 indicates a passage of time downward, solid arrows indicate the data transmission/reception between the remote-control apparatus 100, the local-control apparatus 200, and the equipment 300, and downward arrows indicate measurements related to the equipment 300 performed in the local-control apparatus 200. In FIG. 2, the local-control apparatus 200 transmits a measurement value to the remote-control apparatus 100, and the remote-control apparatus 100 calculates and transmits a control value corresponding to this measurement value to the local-control apparatus 200, and then the local-control apparatus 200 controls the equipment 300 according to this received control value and obtains a new measurement value related to the equipment 300.

The control system 10 requires communication between the remote-control apparatus 100 and the local-control apparatus 200 for the data transmission/reception. There are fluctuations in this communication, which causes variations in a period from transmission of a measurement value till reception of a control value (i.e., a communication period shown in FIG. 2), and thus a control delay caused by the communication delay is unstable. Therefore, a control operation corresponding to the control value, which is once judged as being optimal, may no longer be optimal at a timing of performing the control operation on the equipment 300. Accordingly, the control system 10 of the present embodiment calculates a control value corresponding to a delay amount that corresponds to the control delay, by using the model 135 which takes into account the control delay.

Figure 3:
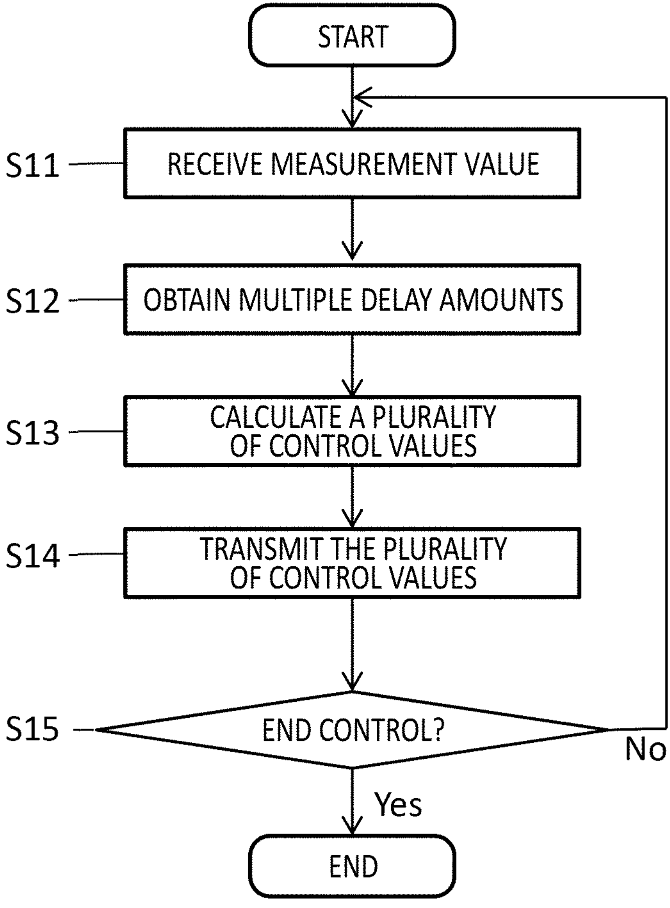
FIG. 3 illustrates one example of a processing flow of a remote-control apparatus 100 of the present embodiment.

FIG. 3 illustrates one example of a processing flow of the remote-control apparatus 100 of the present embodiment. Note that, operations of the processing flow may start in response to receiving a measurement value from the local-control apparatus 200.

In step S11, the measurement value receiving unit 110 receives the measurement value from the local-control apparatus 200. The measurement value receiving unit 110 supplies the calculating unit 140 with the measurement value.

In step S12, the calculating unit 140 obtains multiple delay amounts. The calculating unit 140 may obtain the multiple delay amounts through a user input. The calculating unit 140 may use as a delay amount, an amount by which a candidate value of a communication period, which is from when the local-control apparatus 200 transmits the measurement value till when the local-control apparatus 200 receives the control value corresponding to this measurement value from the control value transmitting unit 150, exceeds a preset time margin. The candidate value for the communication period may be set through the user input based on a communication period in a cycle prior to a current cycle. The time margin may be set to a length less than one cycle of control performed by the local-control apparatus 200, through the user input, which is from the transmission of the measurement value to immediately before transmission of the measurement value for a next cycle.

By way of example, a mean value of communication periods measured in multiple cycles is approximately 50 ms. Due to the fluctuations in the communication, the communication periods may be the mean value+1 s at maximum. If a cycle of the control is 200 ms, the time margin can be set to 100 ms and the delay amount can be set every 200 ms in order to ensure enough time for the local-control apparatus 200 to obtain a measurement value. Accordingly, the calculating unit 140 may use the delay amounts 0, 200, 400, 600, 800, and 1000 ms for candidate values 100, 300, 500, 700, 900, and 1100 ms of the communication periods. Note that, if the mean value of the communication period is around 0 ms, and fluctuations occur sporadically in the communication, then the time margin may be set to 0 ms.

In addition, the calculating unit 140 may obtain the delay amount based on control delay received together with the measurement value from the local-control apparatus 200. The calculating unit 140 may use as the delay amount, a value obtained by adding a preset value (200 ms, by way of example) to the received control delay, and a difference between the control delay and a preset value. The preset value may be set through a user input. The remote-control apparatus 100 may decide to use the time margin through the user input. In this case, the remote-control apparatus 100 may transmit an indication indicating that the time margin is to be used to the local-control apparatus 200.

In step S13, the calculating unit 140 inputs each delay amount and the measurement value into the model 135, and calculates a control value as an output of the model 135. The calculating unit 140 may use a model 135 that is trained by reinforcement learning using a known algorithm such as Kernel Dynamic Policy Programming (KDPP), Temporal Difference Learning (TD learning), Monte Carlo method, or the like.

By way of example, an example will be described below in which the calculating unit 140 uses a model 135 trained by a Kernel method such as KDPP. The calculating unit 140 generates a vector for a state s from the measurement value and the each delay amount. That is, the calculating unit 140 generates a vector for a plurality of states s1 to sn (n>1) corresponding to the each of the multiple delay amounts. Next, the calculating unit 140 generates a plurality of control operation deciding tables indicating combinations of each of the states sl to sn and all possible control operations. Then, the calculating unit 140 inputs each of the control operation deciding tables into the model 135. The model 135 may have a weight table in which a weight is associated with sample data (i.e., a state and control operation). Kernel calculation is performed between each row of the control operation deciding tables and each sample data of the model 135 depending on an input, and thereby each distance to the each sample data is calculated. Then, a reward value is calculated for each control operation by sequentially adding up values obtained by multiplying the distance calculated for the each sample data by each weight. The model 135 selects a control operation (i.e., control value) of which reward value calculated in this way is the highest. In this way, the calculating unit 140 can calculate a control value corresponding to the each delay amount. The calculating unit 140 may supply the control value transmitting unit 150 with data (a table, by way of example) indicating correspondence of the control value to the each delay amount.

In step S14, the control value transmitting unit 150 transmits data indicating correspondence of each control value to each delay amount to the local-control apparatus 200.

In step S15, the remote-control apparatus 100 judges whether the control of the equipment 300 performed by the local-control apparatus 200 has ended. If not ended (i.e., step S15; No), then the flow returns step S11, and if ended (i.e., step S15; Yes), then the processing flow ends.

FIG. 4 illustrates one example of the control operation deciding table input into the model 135. The control operation deciding table shows states composed of a measurement value 1, a measurement value 2, and a delay amount Δt=200, which are measured in the same cycle, and six possible control operations. Among the control operations, 5 refers to opening the valve by 5%, 3 refers to opening the valve by 3%, 1 refers to opening the valve by 1%, 0 refers to maintaining a current state of the valve, −3 refers to closing the valve by 3%, and −5 refers to closing the valve by 5%. The delay amount Δt is an amount by which the candidate value of the communication period exceeds a time margin 100 ms, and the calculating unit 140 creates control operation deciding tables similar to that above for other delay amounts of Δt=0, 400, 600, 800, 1000 ms, by way of example.

FIG. 5 illustrates one example of a weight table of the model 135. The model 135 has the weight table formed of: sample data being a combination of a state s indicating a set of a measured measurement value and a delay amount of the measured control delay, and a control operation performed under each state; and a weight calculated by a reward value. Note that, such a weight may be decided such that the larger a reward value determined by a reward function calculated in the learning processing unit 120 is, the larger a value of the weight becomes.

FIG. 6 illustrates one example of a table showing correspondence of a plurality of control values to multiple delay amounts. The table shows indexes, delay amounts Δt, and control operations. A delay amount Δt is an amount by which a candidate value of a communication period exceeds a time margin 100 ms. In this table, each index is associated with the delay amount, and a control operation indicated by a control value. The control value transmitting unit 150 may transmit such a table as that illustrated in FIG. 6 to the local-control apparatus 200.

Figure 7:
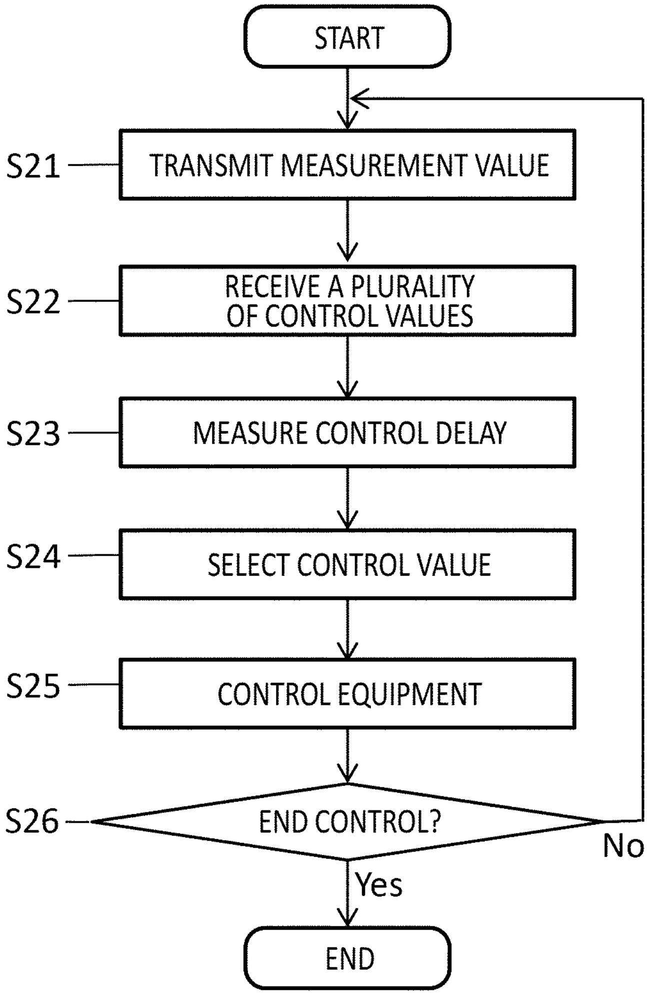
FIG. 7 illustrates one example of a processing flow of a local-control apparatus 200 of the present embodiment.

FIG. 7 illustrates one example of a processing flow of the local-control apparatus 200 of the present embodiment. Note that, operations of the processing flow may start in response to an instruction of a user input to the local-control apparatus 200. The instruction of the user which is input may include an input of an identifier such as a name of an apparatus or an identification number for indicating the equipment 300 being a control target.

In step S21, the controlling unit 250 obtains a measurement value from the equipment 300, and then the measurement value transmitting unit 210 transmits the measurement value to the remote-control apparatus 100. The controlling unit 250 may obtain a measurement value directly received from one or more sensors or the like of the equipment 300, may obtain a measurement value from a computer or the like deposited in the equipment 300, or may obtain a measurement value related to the equipment 300, which is directly measured by the local-control apparatus 200. The measurement value transmitting unit 210 may transmit this measurement value to the remote-control apparatus 100, together with an identifier indicating a type etc. of the measurement value. The measurement value transmitting unit 210 supplies the delay measuring unit 230 with data (a timestamp etc., by way of example) indicating time at which the measurement value was transmitted.

In step S22, the control value receiving unit 220 receives a plurality of control values corresponding to the transmitted measurement value from the remote-control apparatus 100. The control value receiving unit 220 supplies the delay measuring unit 230 with data (a timestamp etc., by way of example) indicating time at which the control value was received.

In step S23, the delay measuring unit 230 decides control delay of a current cycle. The delay measuring unit 230 may measure a period from the transmission time of the measurement value to the reception time of the control value, by using the data indicating the time at which the measurement value was transmitted from the measurement value transmitting unit 210, and the data indicating the time at which the control value was received from the control value receiving unit 220 in the current cycle. In addition, the delay measuring unit 230 may measure a period from the time at which the measurement value was obtained by the controlling unit 250 to the time at which the control value was received by the selecting unit 240 from the control value receiving unit 220.

In the remote-control apparatus 100, if the amount by which the time margin is exceeded in step S12 is used as the delay amount, the delay measuring unit 230 may decide as control delay, an amount by which the measured period exceeds a preset time margin. The time margin may be set through a user input, or be the same as the time margin used in step S12 in the remote-control apparatus 100. The local-control apparatus 200 may decide to use the time margin by receiving an indication indicating the time margin through the user input or from the remote-control apparatus 100. Alternatively, the delay measuring unit 230 may decide as control delay, the measured period if not using the time margin. The delay measuring unit 230 supplies the selecting unit 240 with the control delay.

In step S24, the selecting unit 240 selects one control value among the received plurality of control values, depending on the decided control delay. The selecting unit 240 may compare the decided control delay with multiple delay amounts in a table, and select a control value corresponding to a delay amount closest to the control delay among the multiple delay amounts. If the control delay is a value between two delay amounts, the selecting unit 240 may decide a control operation by adding an operation amount of a control value weighted depending on a difference with delay amount. By way of example, if control delay is 20 ms, the selecting unit 240 may select from the table in FIG. 6, an operation amount 5% of a control value for a delay amount 0, and an operation amount 3% of a control value for a delay amount 200 ms, and because (5%×180/200)+(3%×20/200)=4.8%, the selecting unit 240 may decide on a control operation of opening the valve by 4.8%. The selecting unit 240 supplies the controlling unit 250 with the decided control operation.

In step S25, the controlling unit 250 performs the selected control operation on the equipment 300. The controlling unit 250 may output control data indicating the control operation to the control target of the equipment 300. Alternatively, the controlling unit 250 may directly perform control operation corresponding to the selected control value on the control target. The controlling unit 250 performs the control of the equipment 300, if using a preset time margin, at least after the preset time margin has passed since the measurement value was transmitted by the measurement value transmitting unit 210. Even if the controlling unit 250 has already received control data from the selecting unit 240, the controlling unit 250 does not perform the control till when the time margin is passed after the transmission of the measurement value in step S21. The controlling unit 250 may immediately perform the control operation if the control data is supplied from the selecting unit 240 after the time margin has passed.

In step S26, the local-control apparatus 200 judges whether the controls of the equipment 300 has ended, and if not ended (i.e., step S26; No), then the flow returns step S21, and if ended (i.e., step S26; Yes), then the processing flow ends.

Such a processing flow of the remote-control apparatus 100 shown in FIG. 3 and such a processing flow of the local-control apparatus 200 shown in FIG. 7 described above may be executed in parallel, for example, may be executed in the order of step S21, step S11, step S12, step S13, step S14, step S15, step S22, step S23, step S24, step S25, and step S26.

Figure 8:
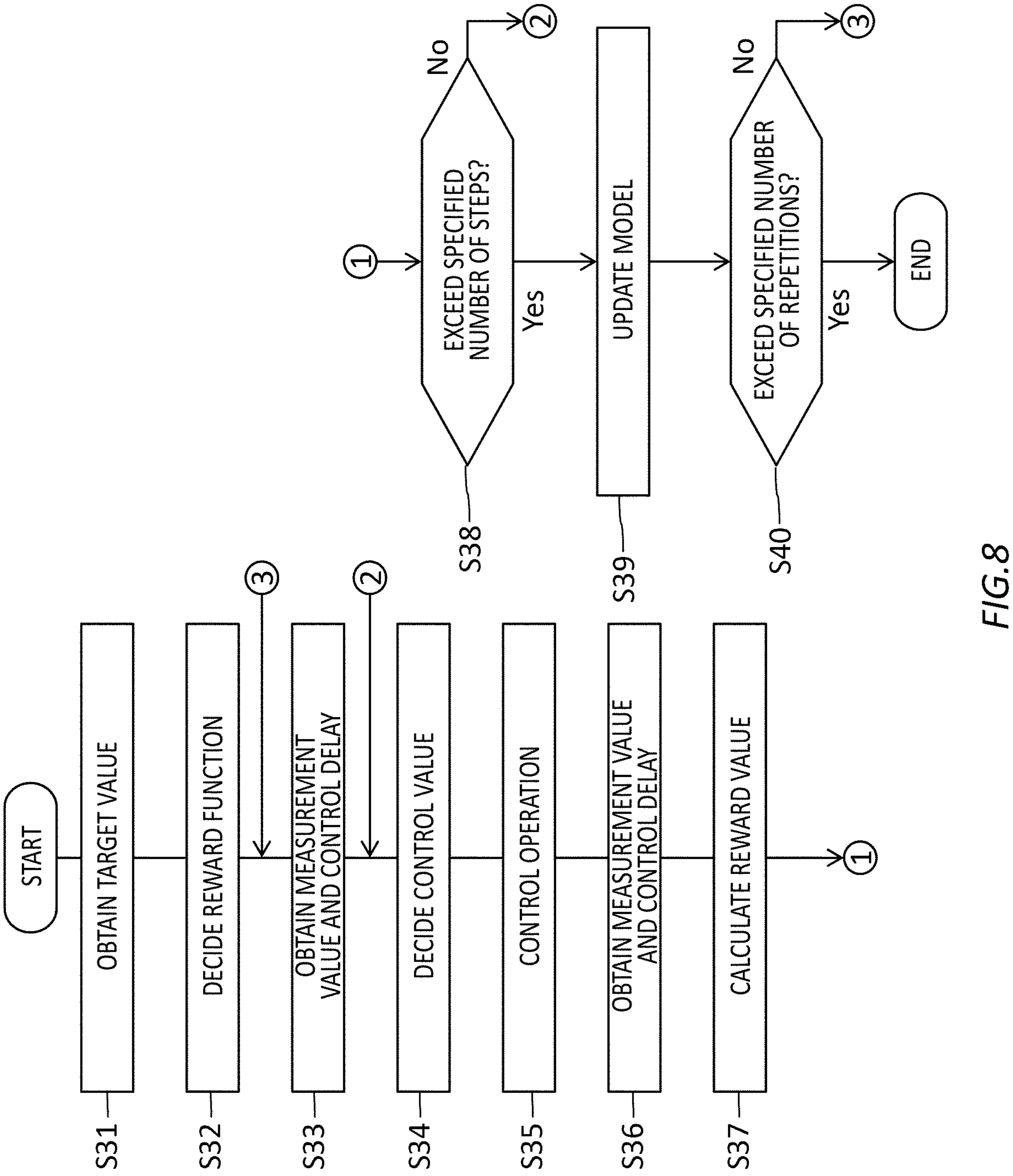
FIG. 8 illustrates one example of a learning flow of the remote-control apparatus 100 in the control system 10 according to the present embodiment.

FIG. 8 illustrates one example of a learning flow of the remote-control apparatus 100 in the control system 10 according to the present embodiment. The learning processing unit 120 of the remote-control apparatus 100 may execute reinforcement learning on the model 135 using a known algorithm such as KDPP, TD learning, or Monte Carlo method. Hereinafter, an example will be described in which the reinforcement learning is executed by using Kernel method such as KDPP.

In step S31, the learning processing unit 120 obtains a target value. The target value may be a parameter of the same type as that of any measurement value (tank water level etc., by way of example), or may be a parameter of the same type as that of a control operation amount indicated by a control value (an opening degree of a valve etc., by way of example). The learning processing unit 120 may obtain the target value through a user input. Alternatively, the learning processing unit 120 may obtain a target value the same as a target value used in previous learning processing.

In step S32, the learning processing unit 120 decides a reward function by using the target value. The learning processing unit 120 may decide the reward function such that a reward value becomes higher when a state related to the equipment 300, which is controlled according to the control value calculated from the model 135, approaches a state corresponding to the target value. Alternatively, the learning processing unit 120 may decide the reward function such that a reward value becomes higher when a measurement value related to the equipment 300 that is controlled by the model 135 satisfies a content of the target value.

In step S33, similar to steps S21 and S23, the controlling unit 250 obtains and transmits a measurement value related to the equipment 300 and a delay amount Δt of control delay to the remote-control apparatus 100. For example, the controlling unit 250 may obtain the measurement value and the delay amount Δt of the control delay from the equipment 300. The controlling unit 250 may use zero for a delay amount Δt of control delay when obtaining a measurement value for the first time, for example. Alternatively, the remote-control apparatus 100 may obtain the measurement value and the delay amount Δt of the control delay from a simulator.

In step S34, similar to step S13, the calculating unit 140 decides a control value by using the model 135. At the time of learning, the calculating unit 140 may randomly decide the control value. The calculating unit 140 supplies the control value transmitting unit 150 with the control value, and then the control value transmitting unit 150 transmits the control value to the local-control apparatus 200.

In step S35, the local-control apparatus 200 controls the equipment 300 depending on the supplied control value. Similar to steps S23 and S24, the local-control apparatus 200 may select a control value corresponding to a measured control delay. The local-control apparatus 200 may cause control delay with a randomly set delay amount, and select a control value corresponding to this control delay. Also, the local-control apparatus 200 may cause a simulator to perform simulation depending on the supplied control value. The local-control apparatus 200 transmits a new measurement value obtained in response to controlling the equipment 300 by using the control value, and a delay amount Δt of a measured control delay or a delay amount Δt used when a used control value is calculated by the model 135, to the remote-control apparatus 100.

In step S36, the measurement value receiving unit 110 receives the new measurement value obtained in response to controlling the equipment 300 by using the calculated control value, and a delay amount Δt of control delay corresponding to this used control value, from the local-control apparatus 200. In this manner, a measurement value of a state after being changed in response to a control operation having performed on the equipment 300 by using the decided control value is obtained. The measurement value receiving unit 110 supplies the learning processing unit 120 with the received measurement value and delay amount Δt.

In step S37, the learning processing unit 120 calculates a reward value based on the obtained measurement value and delay amount of the control delay. The learning processing unit 120 may calculate the reward value by using the reward function decided in step S32.

In step S38, the learning processing unit 120 determines whether obtaining processing for obtaining a measurement value and a delay amount of control delay corresponding to control has exceeded a specified number of steps. Note that, such a number of steps may be specified in advance by a user, or may be determined based on a learning period (for example, 10 days etc.). If it is determined that the obtaining processing described above has not exceeded the specified number of steps (i.e., step S38; No), then the learning processing unit 120 causes the processing to return step S34, and continues the processing flow. In this manner, the obtaining processing of a measurement value and a delay amount of control delay corresponding to control is executed for the specified number of steps.

In step S38, if it is determined that the obtaining processing described above has exceeded the specified number of steps (i.e., step S38; Yes), then the learning processing unit 120 causes the processing to proceed to step S39.

In step S39, the learning processing unit 120 calculates a weight for each sample data from the reward value, and updates the model 135. For example, the learning processing unit 120 not only overwrites values in the weight column in the weight table of the model 135 shown in FIG. 5, but also adds new sample data that is not preciously stored to the model 135.

In step S40, the learning processing unit 120 determines whether update processing on the model 135 has exceeded a specified number of repetitions. Note that, such a number of repetitions may be specified in advance by a user, or may be determined depending on validity of the model 135. If it is determined that the updating processing described above has not exceeded the specified number of repetitions (i.e., step S40; No), then the learning processing unit 120 causes the processing to return step S33, and continues the processing flow.

In step S40, if it is determined that the updating processing described above has exceeded the specified number of repetitions (i.e., step S40; Yes), then the learning processing unit 120 ends the processing flow. In this way for example, the learning processing unit 120 can generate the model 135 for outputting a control value corresponding to a measurement value and control delay related to the equipment 300.

According to the present embodiment, a control value obtained by using the model 135 which takes into account impact on control due to fluctuations in communication can be calculated, and an optimal control operation can be executed on the equipment 300 depending on this control value.

Note that, the model storing unit 130 may store the model 135 generated outside the remote-control apparatus 100. In this case, the remote-control apparatus 100 may not have a learning processing unit 120. Further, a learning processing apparatus for only performing learning processing may at least include the measurement value receiving unit 110 and the learning processing unit 120 of the present embodiment.

Note that, the calculating unit 140 may calculate each control value by using the model 135 for when the delay amount $\Delta t=0$ and when the delay amount $\Delta t>0$, and create a table in which the two control values are each associated with a bit 0 and a bit 1 for when the delay amount $\Delta t=0$ and when the delay amount $\Delta t>0$. Then, the control value transmitting unit 150 may transmit this table to the local-control apparatus 200.

Various embodiments of the present invention may be described with reference to flowcharts and block diagrams of which blocks may represent (1) stages of processes in which operations are executed or (2) sections of an apparatus for executing operations. Certain stages and sections may be implemented by a dedicated circuit, a programmable circuit supplied with a computer-readable instruction stored on a computer readable medium, and/or a processor supplied with a computer-readable instruction stored on a computer readable medium. The dedicated circuit may include a digital and/or analog hardware circuit, and may include an integrated circuit (IC) and/or a discrete circuit. The programmable circuit may include a reconfigurable hardware circuit including logical AND, logical OR, logical XOR, logical NAND, logical NOR, and other logical operations, a memory element etc. such as a flip-flop, a register, a field programmable gate array (FPGA) and a programmable logic array (PLA), and the like.

The computer readable medium may include any tangible device that can store instructions to be executed by a suitable device, and as a result, the computer readable medium having instructions stored thereon includes an article of manufacture including instructions which can be executed in order to create means for executing operations specified in the flowcharts or block diagrams. An example of the computer readable medium may include an electronic storage medium, a magnetic storage medium, an optical storage medium, an electromagnetic storage medium, a semiconductor storage medium, or the like. More specific example of the computer readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, or the like.

The computer-readable instruction may include: an assembler instruction, an instruction-set-architecture (ISA) instruction; a machine instruction; a machine dependent instruction; a microcode; a firmware instruction; state-setting data; or either a source code or an object code written in any combination of one or more programming languages, including an object oriented programming language such as Smalltalk (registered trademark), JAVA (registered trademark), C++, or the like; and a conventional procedural programming language such as a "C" programming language or a similar programming language.

The computer-readable instruction may be provided to a processor of a general-purpose computer, special purpose computer, or another programmable data processing apparatus 200, or to a programmable circuit, locally or via a local area network (LAN), wide area network (WAN) such as the Internet, or the like, to execute the computer-readable instructions in order to create means for executing operations specified in the flowcharts or block diagrams. An example of the processor includes a computer processor, a processing unit, a microprocessor, a digital signal processor, a controller, a microcontroller, or the like.

Figure 9:
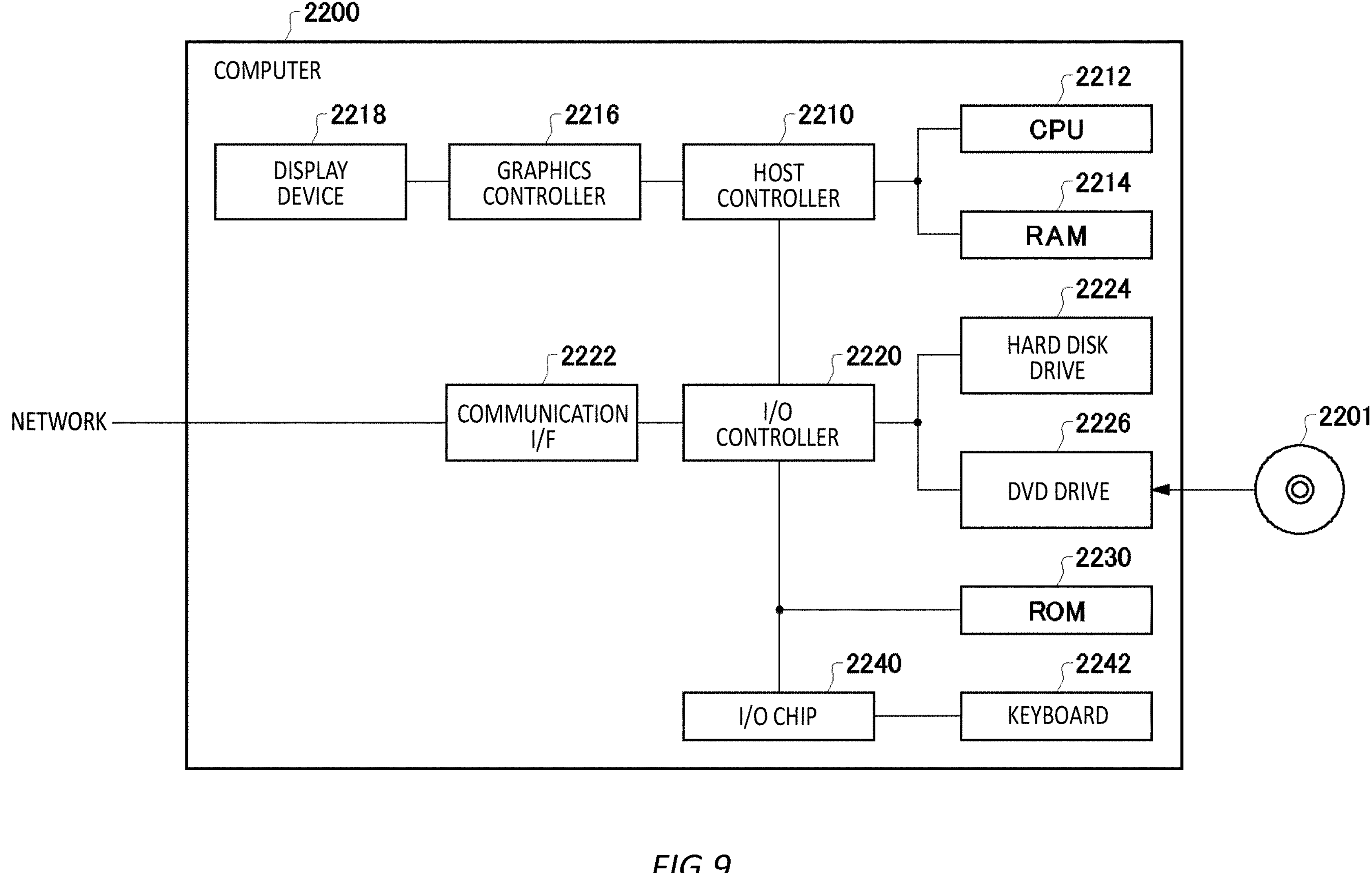
FIG. 9 illustrates an example of a computer 2200 in which a plurality of aspects of the present invention may be entirely or partially embodied.

FIG. 9 illustrates an example of a computer 2200 through which a plurality of aspects of the present invention may be entirely or partially embodied. A program that is installed in the computer 2200 can cause the computer 2200 to function as an operation associated with the apparatus according to the embodiment of the present invention or one or more sections of this apparatus, or can cause the computer 2200 to execute this operation or this one or more sections, and/or can cause the computer 2200 to execute a process or a stage of this process of the embodiment according to the present invention. Such a program may be executed by a CPU 2212 so as to cause the computer 2200 to execute certain operations associated with some or all of the flowcharts and the blocks in the block diagrams described herein.

The computer 2200 according to the present embodiment includes the CPU 2212, a RAM 2214, a graphics controller 2216 and a display device 2218, which are mutually connected by a host controller 2210. The computer 2200 further includes input/output units such as a communication interface 2222, a hard disk drive 2224, a DVD-ROM drive 2226 and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphics controller 2216 obtains image data generated by the CPU 2212 on a frame buffer or the like provided in the RAM 2214 or in itself, and to cause the image data to be displayed on the display device 2218.

The communication interface 2222 communicates with other electronic devices via a network. The hard disk drive 2224 stores programs and data which are used by the CPU 2212 in the computer 2200. The DVD-ROM drive 2226 reads programs or data from a DVD-ROM 2201, and to provide the hard disk drive 2224 with the programs or data via the RAM 2214. The IC card drive reads the programs and the data from the IC card, and/or writes the programs and the data to the IC card.

The ROM 2230 stores therein a boot program or the like executed by the computer 2200 at the time of activation, and/or a program depending on the hardware of the computer 2200. The input/output chip 2240 may also connect various input/output units via a parallel port, a serial port, a keyboard port, a mouse port or the like to the input/output controller 2220.

A program is provided by a computer readable medium such as the DVD-ROM 2201 or the IC card. The program is read from the computer readable medium, installed into the hard disk drive 2224, RAM 2214, or ROM 2230, each of which is an example of a computer readable medium, and executed by CPU 2212. The information processing written in these programs is read into the computer 2200, and thus cooperation between the programs and the above-described various types of hardware resources is provided. An apparatus or method may be constituted by performing the operations or processing of information in accordance with the use of the computer 2200.

For example, when communication is executed between the computer 2200 and an external device, the CPU 2212 may execute a communication program loaded onto the RAM 2214 to instruct communication processing to the communication interface 2222, based on the processing written in the communication program. The communication interface 2222, under control of the CPU 2212, reads transmission data stored on a transmission buffer processing region provided in a recording medium such as the RAM 2214, the hard disk drive 2224, DVD-ROM 2201, or the IC card, and transmits the read transmission data to a network or writes reception data received from a network to a reception buffer processing region or the like provided on the recording medium.

Also the CPU 2212 may cause all or a necessary portion of a file or a database to be read into the RAM 2214, of which file or the database has been stored in an external recording medium such as the hard disk drive 2224, the DVD-ROM drive 2226 (DVD-ROM 2201), the IC card, etc., and execute various types of processing on the data on the RAM 2214. The CPU 2212 then writes back the processed data to the external recording medium.

Various types of information such as various types of programs, data, tables, and databases may be stored in a recording medium and subjected to information processing. The CPU 2212 may execute various types of processing on the data read from the RAM 2214, which includes various types of operations, information processing, conditional judging, conditional branch, unconditional branch, search/replacement of information, etc., as described throughout this disclosure and specified by an instruction sequence of programs, and writes the result back to the RAM 2214. Also the CPU 2212 may search for information in a file, a database, etc., in the recording medium. For example, when a plurality of entries, each having an attribute value of a first attribute associated with an attribute value of a second attribute, are stored in the recording medium, the CPU 2212 may search for an entry whose attribute value of the first attribute matches a specified condition, from among this plurality of entries, and read the attribute value of the second attribute stored in this entry, thereby obtaining the attribute value of the second attribute associated with the first attribute satisfying the predefined condition.

The above described program or software modules may be stored in the computer readable medium on or near the computer 2200. Also a recording medium such as a hard disk or a RAM provided in a server system connected to a dedicated communication network or the Internet can be used as the computer readable medium, thereby providing the program to the computer 2200 via the network.

While the present invention has been described with the embodiments, the technical scope of the present invention is not limited to the above-described embodiments. It is apparent to persons skilled in the art that various alterations or improvements can be added to the above-described embodiments. It is also apparent from the description of the claims that an embodiment to which such alterations or improvements are made can be included in the technical scope of the present invention.

It should be noted that the operations, procedures, steps, stages, etc. of each processing executed by an apparatus, system, program, and method shown in the claims, specification, or drawings can be performed in any order as long as the order is not clearly indicated by "prior to", "before", or the like and as long as the output from a previous processing is not used in a later processing. Even if the operation flow is described using phrases such as "first" or "next" in the claims, specification, or drawings, it does not necessarily mean that the flow must be performed in this order.

What is claimed is:

1. A remote-control apparatus, comprising at least one processor, wherein:

the at least one processor receives a measurement value related to equipment from a local-control apparatus;

the at least one processor calculates a control value using the measurement value and a delay amount;

the control value is calculated from the delay amount and the measurement value as an output of a model;

the at least one processor transmits the control value to the local-control apparatus;

the local-control apparatus controls the equipment using the control value when there is control delay caused by communication delay between the remote-control apparatus and the local-control apparatus; and the control delay is derived from the delay amount and the measurement value.

2. The remote-control apparatus according to claim 1, wherein the at least one processor uses, as the delay amount, an amount by which a candidate value of a period from when the local-control apparatus transmits the measurement value until when the local-control apparatus receives the control value that exceeds a preset time margin.

3. The remote-control apparatus according to claim 1, wherein:

the at least one processor calculates, by using the model and from the measurement value, a plurality of control values, wherein each of the plurality of control values corresponds to one of a plurality of delay amounts, wherein the plurality of delay amounts includes the delay amount; and the at least one processor transmits the plurality of control values to the local-control apparatus.

4. The remote-control apparatus according to claim 3, wherein the at least one processor transmits data indicating correspondence of the plurality of control values to the plurality of delay amounts to the local-control apparatus.

5. The remote-control apparatus according to claim 1, wherein:

the at least one processor receives a new measurement value obtained in response to controlling the equipment using the control value and control delay corresponding the control value; and the at least one processor updates the model by using the control delay and the new measurement value.

6. A local-control apparatus, comprising at least one processor, wherein:

the at least one processor transmits a measurement value related to equipment to a remote-control apparatus;

the remote-control apparatus calculates a plurality of control values using the measurement value;

the at least one processor receives, from the remote-control apparatus, the plurality of control values corresponding to the measurement value;

the at least one processor selects a selected control value used to control the equipment, from among the plurality of control values, depending on a control delay caused by communication delay between the local-control apparatus and the remote-control apparatus;

the at least one processor performs the control of the equipment according to the selected control value, and wherein the plurality of control values are calculated from the control delay and the measurement value as an output of a model.

7. The local-control apparatus according to claim 6, wherein:

the at least one processor measures a measured period from when the at least one processor transmits the measurement value until when the at least one processor receives the plurality of control values; and the at least one processor determines the control delay based on the measured period.

8. The local-control apparatus according to claim 7, wherein:

the at least one processor decides the control delay according to the measured period if the measured period exceeds a preset time margin; and the at least one processor performs the control of the equipment after the preset time margin has passed since the at least one processor has transmitted the measurement value.

9. A method, using at least one processor, comprising:

receiving, using the at least one processor, a measurement value related to equipment from a local-control apparatus that is used to control the equipment;

calculating, using the at least one processor, a control value corresponding to the measurement value and a delay amount, by using a model that calculates from the delay amount and the measurement value the control value, wherein the control value is used to control of the equipment when there is control delay caused by communication delay between a remote-control apparatus and the local-control apparatus, wherein the control delay is derived from the delay amount and the measurement value; and transmitting, using the at least one processor, the control value to the local-control apparatus and controlling the equipment using the control value.

10. A non-transitory recording medium for recording thereon a program that causes a computer comprising at least one processor to function as:

a measurement value receiving unit that receives a measurement value related to equipment from a local-control apparatus, that is used to control the equipment;

a calculating unit that calculates a control value, corresponding to the measurement value and a delay amount, using a model that calculates from the delay amount and the measurement value the control value that is used for control of the equipment when there is control delay caused by communication delay between a remote-control apparatus and the local-control apparatus, wherein the control delay is derived from a delay amount corresponding to the control delay and a measurement value; and a control value transmitting unit that transmits the control value calculated by the calculating unit to the local-control apparatus, wherein the equipment is controlled by the transmitted control value.

11. A method, using at least one processor, comprising:

transmitting, using the at least one processor, a measurement value, related to equipment to a remote-control apparatus, that is used to calculate a plurality of control values at the remote-control apparatus corresponding to the measurement value;

receiving, using the at least one processor, from the remote-control apparatus, the plurality of control values corresponding to the measurement value;

selecting, using the at least one processor, a selected control value used to control the equipment, from among the plurality of control values, depending on a control delay caused by communication delay between a local-control apparatus and the remote-control apparatus; and controlling, using the at least one processor, the equipment according to the selected control value, wherein the plurality of control values are calculated from the control delay and the measurement value as an output of a model.

12. A non-transitory recording medium for recording thereon a program that causes a computer comprising at least one processor to function as:

a measurement value transmitting unit that transmits a measurement value, related to equipment, to a remote-control apparatus from a local-control apparatus, wherein the measurement value is used to calculate a plurality of control values corresponding to the measurement value;

a control value receiving unit that receives, from the remote-control apparatus, the plurality of control values;

a selecting unit that selects a selected control value used to control the equipment, from among the plurality of control values, depending on a control delay caused by communication delay between the local-control apparatus and the remote-control apparatus; and a controlling unit that performs the control of the equipment according to the selected control value, wherein the plurality of control values are calculated from the control delay and the measurement value as an output of a model.

* * * * *